(12) United States Patent  
Fuse et al.

(10) Patent No.: US 9,033,317 B2
(45) Date of Patent: May 19, 2015

(54) FUEL CARBURETOR

(71) Applicants: DENSO CORPORATION, Kariya, Aichi-pref. (JP); National University Corporation Nagoya University, Nagoya-shi, Aichi-ken (JP)

(72) Inventors: Takuya Fuse, Nagoya (JP); Kazutoshi Kuwayama, Kariya (JP); Mitsuhiro Kubota, Nagoya (JP); Ryo Yamanouchi, Nagoya (JP)

(73) Assignees: DENSO CORPORATION, Kariya (JP); National University Corporation Nagoya University, Nagoya (JP)

( * ) Notice: Subject to any disclaimer, the term of this patent is extended or adjusted under 35 U.S.C. 154(b) by 177 days.

(21) Appl. No.: 13/888,478

(22) Filed: May 7, 2013

(65) Prior Publication Data

US 2013/0300007 A1    Nov. 14, 2013

(30) Foreign Application Priority Data

May 10, 2012    (JP) .................................. 2012-108746

(51) Int. Cl.
  *B01D 53/14*   (2006.01)
  *F16L 53/00*   (2006.01)
  *F02M 21/06*   (2006.01)
  *F02M 21/02*   (2006.01)
  *B01F 3/04*    (2006.01)

(52) U.S. Cl.
  CPC ........... *F02M 21/0206* (2013.01); *F02M 21/06* (2013.01); *B01F 3/04* (2013.01); *B01D 53/14* (2013.01); *F16L 53/00* (2013.01); *Y02T 10/32* (2013.01)

(58) Field of Classification Search
  CPC .......... B01F 3/04; B01D 59/26; B01D 53/02; B01D 53/04; B01D 53/14; F16L 53/00; F02M 21/06
  USPC ............................. 261/127; 96/108, 121, 126
  See application file for complete search history.

(56) References Cited

U.S. PATENT DOCUMENTS 2,744,387 A * 5/1956 Reed et al. .................... 137/340
2012/0299306 A1   11/2012 Fuse et al.
2013/0025547 A1    1/2013 Nakagawa et al.

FOREIGN PATENT DOCUMENTS

JP    2006-317127    11/2006
JP    2010-223575    10/2010
JP    2010-272556    12/2010

(Continued)

OTHER PUBLICATIONS

Office Action dated Feb. 3, 2015 in the corresponding CN Application No. 2013 1016 0655.0 with English translation.

*Primary Examiner* — Robert A Hopkins
(74) *Attorney, Agent, or Firm* — Harness, Dickey & Pierce, PLC

(57) ABSTRACT

A fuel carburetor includes a fuel passage, a heat medium passage, a space part, and an absorbent material. Ammonia as fuel flows through the fuel passage. The heat medium passage is arranged adjacent to the fuel passage, and a heat medium flows through the heat medium passage. Ammonia gas leaking out of the fuel passage flows into the space part. The absorbent material is provided in the space part for absorbing the ammonia gas. The fuel carburetor is configured to exchange heat between the fuel flowing through the fuel passage and the heat medium flowing through the heat medium passage so as to heat and vaporize the fuel.

6 Claims, 6 Drawing Sheets

(56) References Cited

FOREIGN PATENT DOCUMENTS

| JP | 2011-143945 | 7/2011 |
| JP | 2011-144438 | 7/2011 |
| JP | 2012-017029 | 1/2012 |
| JP | 2012-017698 | 1/2012 |
| JP | 2012-017922 | 1/2012 |
| JP | 2012-233655 | 1/2012 |

* cited by examiner

FUEL CARBURETOR

CROSS REFERENCE TO RELATED APPLICATION

This application is based on Japanese Patent Application No. 2012-108746 filed on May 10, 2012, the disclosure of which is incorporated herein by reference.

TECHNICAL FIELD

The present disclosure relates to a fuel carburetor that is used for a fuel supply system which supplies fuel to an energy output means for consuming fuel to output energy and that evaporates ammonia as fuel to supply the evaporated fuel to the energy output means.

BACKGROUND

In JP-A-2006-317127, there is described a water-sprinkling type ammonia removing device that includes a case for a heat pump unit and that sprinkles water over the inside of the case to absorb leaking ammonia gas into water when the ammonia gas leaks out of a heat pump which uses ammonia as refrigerant.

In this water-sprinkling type ammonia removing device, a surface area of water is increased by sprinkling water to form a liquid droplet such that plenty of ammonia gas is absorbed into water. In this ammonia removing device, the water which has absorbed the ammonia gas is stored in a water tank inside the case or is discharged into a treatment facility.

Also to a fuel carburetor that is used for a fuel supply system which supplies fuel to an energy output-means for consuming fuel to output energy and that evaporates ammonia as fuel to supply the evaporated fuel to the energy output means, the above-described ammonia removing device may be applied to prevent the leakage of ammonia gas.

However, if the above conventional ammonia removing device is applied, an evaporation part for evaporating fuel is accommodated in the case, and a sprinkler nozzle is provided in this case. Accordingly, an installation space for this sprinkler nozzle is required. Moreover, water is sprinkled to spread from the sprinkler, nozzle. As a result, a large space for the water sprinkling is needed. For this reason, a size of the entire fuel carburetor including the case increases.

Furthermore, in this case, the water which has absorbed the ammonia gas (i.e., ammonia water) has an alkaline property. Thus, a recovery treatment for this ammonia water is additionally required. In addition, when the ammonia water is accumulated in the water tank inside the case, strong corrosion resistance treatment needs to be performed on the evaporation part to prevent corrosion of the evaporation part by the ammonia water for some reason.

Therefore, in order to avoid these issues, in the fuel carburetor, the ammonia gas needs to be removed without application of the above ammonia removing device.

SUMMARY

The present disclosure addresses at least one of the above issues.

According to the present disclosure, there is provided a fuel carburetor including a fuel passage, a heat medium passage, a space part, and an absorbent material. Ammonia as fuel flows through the fuel passage. The heat medium passage is arranged adjacent to the fuel passage, and a heat medium flows through the heat medium passage. Ammonia gas leaking out of the fuel passage flows into the space part. The absorbent material is provided in the space part for absorbing the ammonia gas. The fuel carburetor is configured to exchange heat between the fuel flowing through the fuel passage and the heat medium flowing through the heat medium passage so as to heat and vaporize the fuel.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
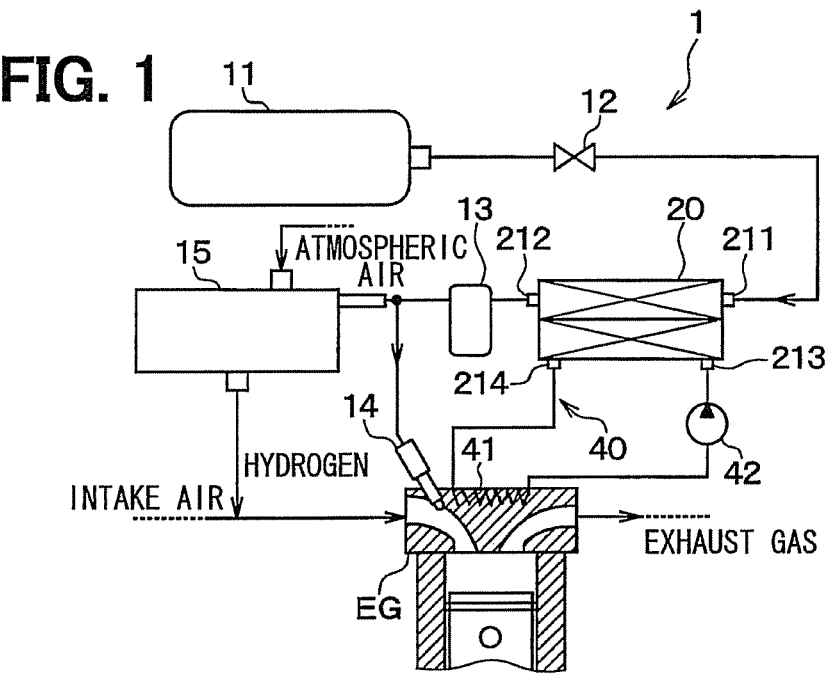
FIG. 1 is a diagram illustrating an entire configuration of a fuel supply system in accordance with a first embodiment.

Embodiments will be described below in reference to the drawings. For the same or equivalent component in the following embodiments, description will be given using its corresponding reference numeral.

First Embodiment

A fuel supply system 1 of the present embodiment is applied to a vehicle, and supplies fuel to an engine (internal combustion engine) EG for outputting driving force for vehicle traveling.

As illustrated in FIG. 1, the fuel supply system 1 includes a high-pressure tank 11, an opening and closing valve 12, a fuel carburetor 20, the engine EG, a fuel injection valve 14, and a reformer 15.

The high-pressure tank 11 is a liquid fuel storage means for storing high-pressure liquid fuel. The fuel stored in the high-pressure tank 11 is ammonia. Ammonia is fuel that has flammability and that is easily liquefied even at an ordinary temperature (approximately 15° C. to 25° C.) under high pressure. Furthermore, ammonia is fuel (hydrogen compound) containing hydrogen, and therefore hydrogen gas having flammability can be generated by reforming the ammonia.

A fuel inlet part 211 of the fuel carburetor 20 is connected to a fuel outlet of the high-pressure tank 11 through the opening and closing valve 12. A flow rate of fuel flowing into the fuel carburetor 20 is regulated through adjustment of a valve opening time of the opening and closing valve 12.

Accordingly, the opening and closing valve 12 is configured as a fuel flow rate regulating means.

The fuel carburetor 20 is a fuel evaporation means for evaporating the fuel flowing out of the high-pressure tank 11. Specifically, the fuel carburetor 20 includes a heat exchanger for exchanging heat between fuel and engine coolant (warm water) as a heat medium. For this reason, the fuel supply system 1 includes a coolant circulation circuit 40 through which engine coolant circulates between the fuel carburetor 20 and the engines EG.

The coolant circulation circuit 40 is a heat medium circulation, circuit through which the coolant for cooling the engine EG circulates. The circuit 40 is a pipe connecting together a heat medium passage inside the fuel carburetor 20, a coolant passage 41 in the engine EG, and a coolant pump 42 as a heat medium circulation means. A heat medium inlet part 213 of the fuel carburetor 20 is connected to a coolant outlet of the engine EG. A heat medium outlet part 214 of the fuel carburetor 20 is connected to a coolant inlet of the engine EG.

A buffer tank 13 for storing the fuel (gaseous fuel) evaporated in the fuel carburetor 20 is connected to a fuel outlet part 212 of the fuel carburetor 20. A flow of gaseous fuel flowing out of the buffer tank 13 branches between two flows through fuel pipes. One branched gaseous fuel flows into the fuel injection valve 14, which injection-supplies gaseous fuel into a combustion chamber of the engine EG. The other branched gaseous fuel flows into the reformer 15, which reforms gaseous fuel to produce hydrogen gas.

The engine EG is configured as a reciprocating engine, and is an energy output means for burning and consuming the gaseous fuel supplied from the fuel carburetor 20 to output mechanical energy serving as the driving force for vehicle traveling with heat generation.

The fuel injection valve 14 is fixed to a cylinder head of the engine EG for injecting gaseous fuel into an intake port of the engine EG. Accordingly, air-fuel mixture in which gaseous fuel and combustion air (intake air) are mixed together is supplied into the combustion chamber.

The reformer 15 heats gaseous fuel to a reformable temperature under the catalytic influence to cause a reforming reaction, so that hydrogen gas is generated. The hydrogen gas generated in the reformer 15 is mixed into intake air as auxiliary fuel to be supplied into the combustion chamber through the intake port of the engine EG.

In the fuel supply system having such a configuration, liquid fuel is evaporated in the fuel carburetor 20 using heat of engine coolant; and the evaporated fuel is supplied to the engine EG through the fuel injection valve 14 and at the same time, hydrogen gas is supplied to the engine EG from the reformer 15.

A specific configuration of the fuel carburetor 20 will be described with reference to FIGS. 2 to 5.

Figure 2:
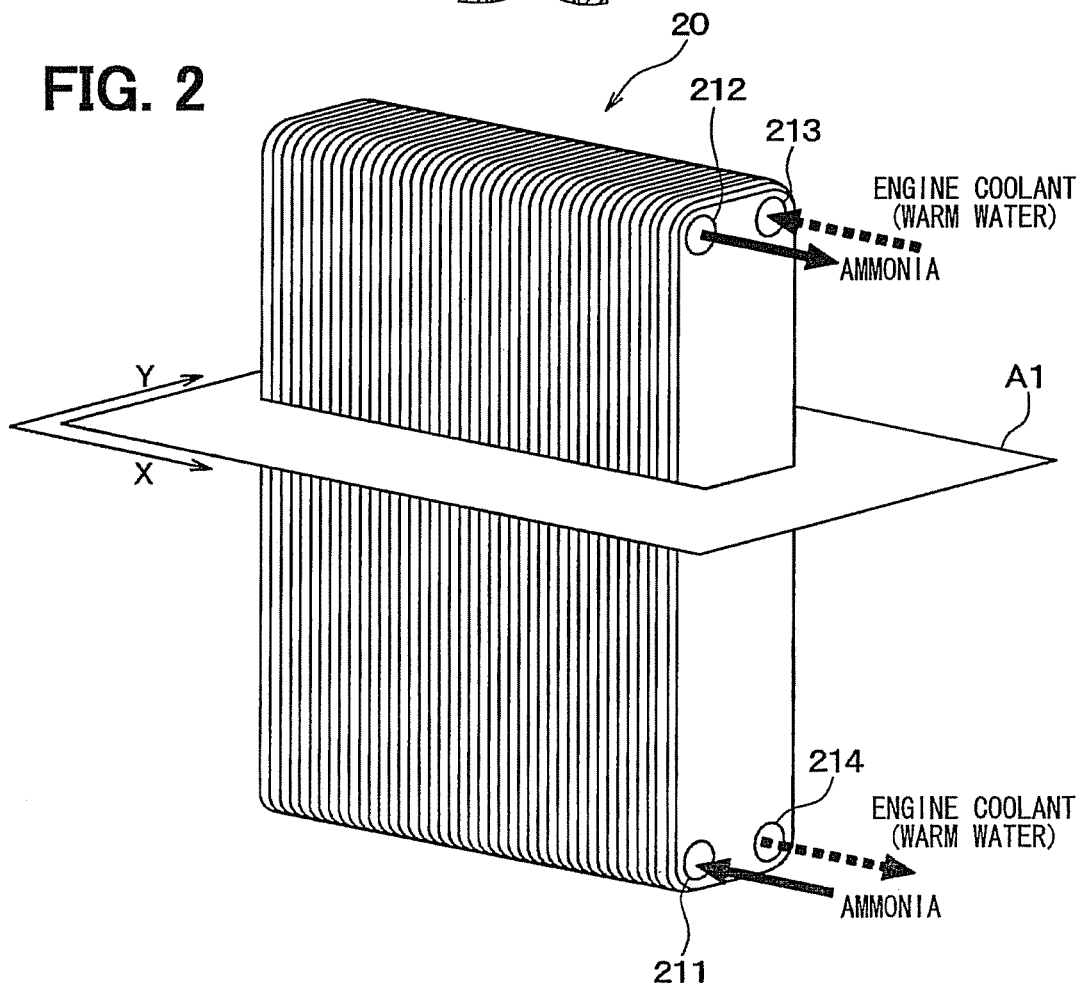
FIG. 2 is a perspective view illustrating a fuel carburetor in FIG. 1.
Figure 3:
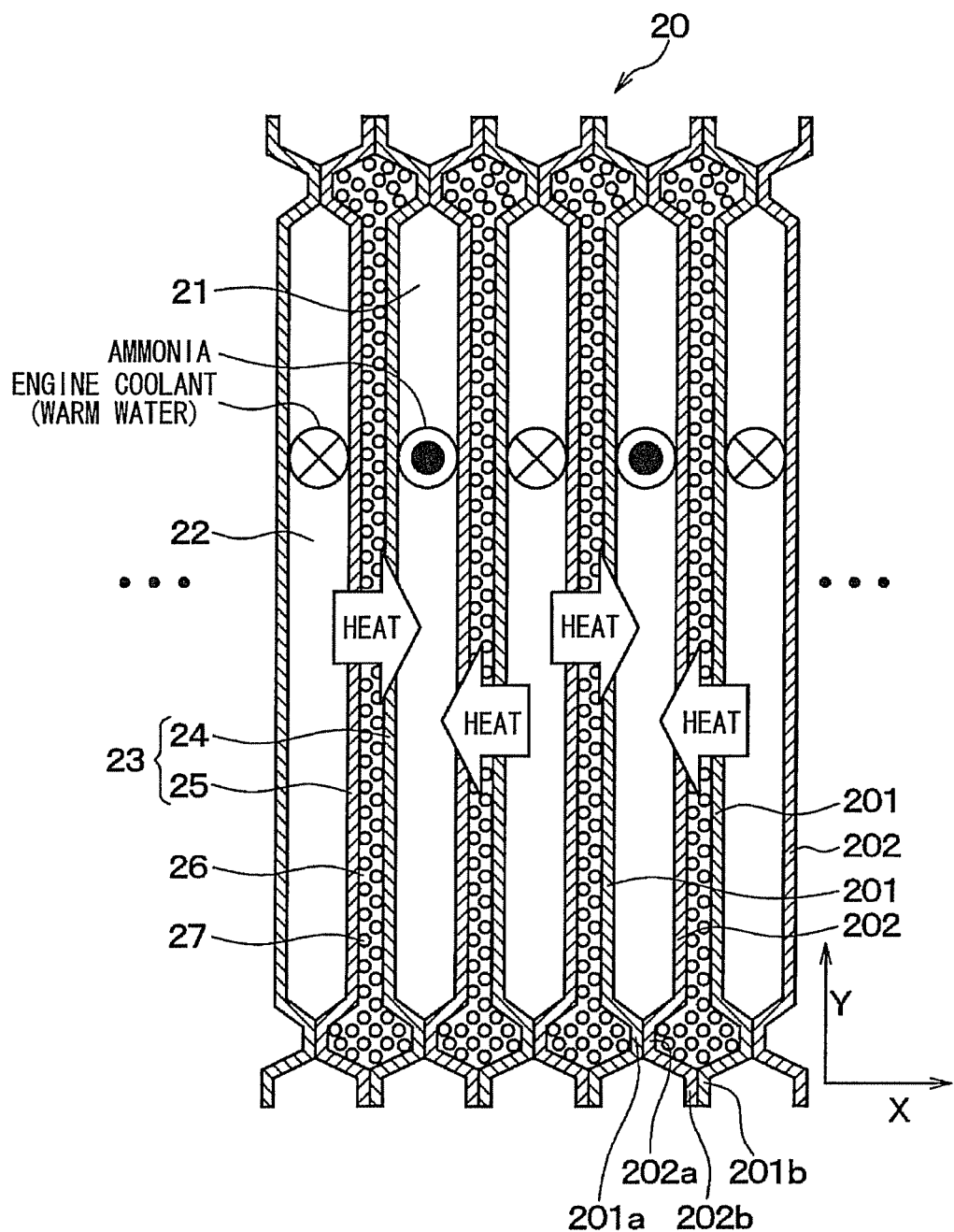
FIG. 3 is a cross-sectional view illustrating the fuel carburetor that is cut by a flat surface A1 including a direction X and a direction Y in FIG. 2.

As illustrated in FIGS. 2 and 3, the fuel carburetor 20 includes a heat exchanger that has a fuel passage 21 through which fuel flows, and a heat medium passage 22 which is located adjacent to this fuel passage 21 and through which a heat medium flows; and that exchanges heat between the fuel flowing through the fuel passage 21 and the heat medium flowing through the heat medium passage 22 to heat and evaporate the fuel by heat of the heat medium. As described above, the fuel is ammonia, and the heat medium is engine coolant (warm water).

This heat exchanger includes a partition part 23 that divides the fuel passage 21 from the heat medium passage 22. This partition part 23 has a double-walled structure. More specifically, this partition part 23 includes a first partitioning wall 24 facing the fuel; and a second partitioning wall 25 that is spaced away from the first partitioning wall 24 to define a space part 26 between the wall 25 and the first partitioning wall 24 and that faces the heat medium. This space part 26 between the first and second partitioning walls 24, 25 is configured as an evacuation passage for evacuating the leaked ammonia gas. This space part 26 is filled with an absorbent material 27 in a solid state for absorbing the ammonia.

Figure 4:
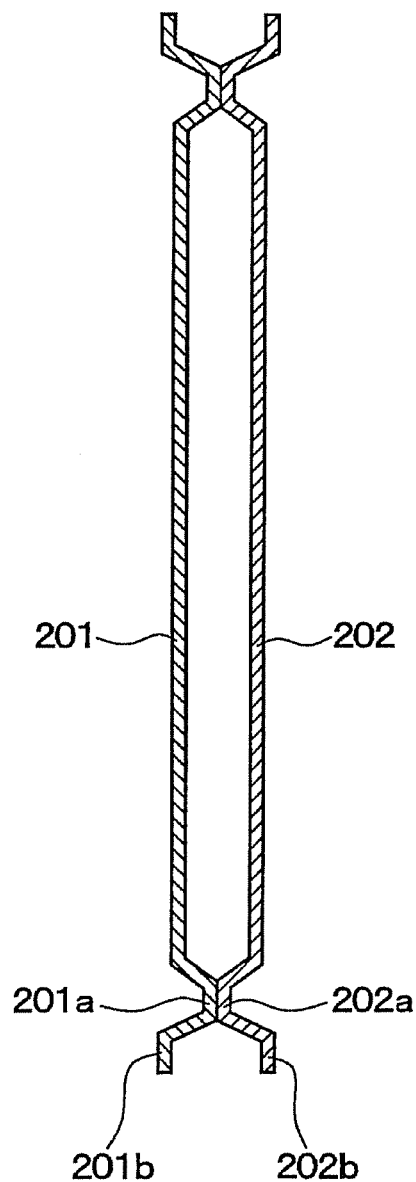
FIG. 4 is a cross-sectional view illustrating a first plate-like member and a second plate-like member in FIG. 3.

Specifically, as illustrated in FIG. 4, two sheets of plate-shaped members (plates) 201, 202 made of stainless alloy are stacked in a wafer-like manner to define one of the fuel passage 21 and the heat medium passage 22. As illustrated in FIG. 3, given that the two sheets of the plate-shaped members 201, 202 which define this one passage are paired, more than one pair of the plate-shaped members are stacked with the space part 26 defined between a pair of the plate-shaped members 201, 202 and its adjacent pair of the plate-shaped members 201, 202. Accordingly, the fuel passages 21 and the heat medium passages 22 are alternately arranged in parallel, with the space part 26 formed between the fuel passage 21 and the heat medium passage 22.

Thus, when the first partitioning wall 24 is one 201 of the two sheets of the plate-shaped members 201, 202 which define the fuel passage 21, the other one 202 of the two sheets of the plate-shaped members 201, 202 which define the heat medium passage 22 is the second partitioning wall 25, the space part 26 being defined between the other one 202 and the one 201. Similarly, when the first partitioning wall 24 is the other one 202 of the two sheets of the plate-shaped members 201, 202 which define the fuel passage 21, one 201 of the two sheets of the plate-shaped members 201, 202 which define the heat medium passage 22 is the second partitioning wall 25, the space part 26 being defined between the other one 202 and the one 201.

As described in FIGS. 3 and 4, at end portions of the plate-shaped members 201, 202, there are provided first joining parts 201a, 202a for joining together the pair of the plate-shaped members, and second joining parts 201b, 202b for joining together the opposed plate-shaped members in the adjacent two pairs of the plate-shaped members. The first joining parts 201a, 202a of the pair of the plate-shaped members 201, 202 are joined together by brazing to close the space inside the pair of the plate-shaped members. With regard to the adjacent two pairs of the plate-shaped members 201, 202, the second joining parts 201b, 202b are joined together by brazing to close the space between the adjacent two pairs of the plate-shaped members 201, 202.

The first joining parts 201a, 202a are formed as crooked parts that are bent convexly inward of the pair of the plate-shaped members 201, 202. The second joining parts 201b, 202b are formed as crooked parts that are bent convexly outward of the pair of the plate-shaped members 201, 202. In the present embodiment, the second joining parts 201b, 202b are arranged further toward the ends of the plate-shaped members 201, 202 than the first joining parts 201a, 202a. Accordingly, with regard to the adjacent two pairs of the plate-shaped members, the space between the first joining part 201a and the first joining part 202a can be used for a space to be filled with the absorbent material 27.

In the present embodiment, metallic halide is used for the absorbent material 27. The metallic halide is put into a chemically stable state through ammonia complexation by its reaction with the ammonia gas. Accordingly, the recovery treatment after the absorption of ammonia gas is unnecessary. The metallic halide is used in a granulated or powdered manner. For example, nickel (II) chloride ($NiCl_2$), calcium chloride ($CaCl_2$), or magnesium chloride ($MgCl_2$) may be employed for the metallic halide, and one or more substances selected from these is (are) used. Although any of these substances is a material having high performance in ammonia gas absorption, $NiCl_2$ can particularly be employed. This is because $NiCl_2$ has the large ammonia gas absorbed amount and a high rate of the absorption.

Figure 5:
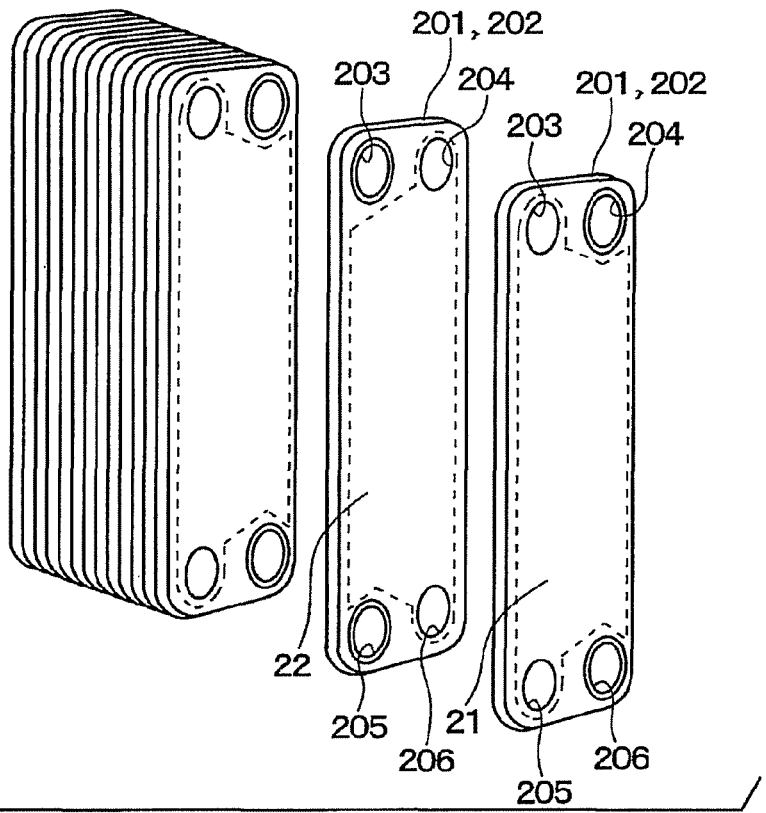
FIG. 5 is a perspective view illustrating the fuel carburetor in FIG. 2.

As illustrated in FIG. 5, the plate-shaped members 201, 202 are vertically long, and tank formation parts 203 to 206 (two for each side) are formed respectively on one end side and the other end side of the pair of the plate-shaped members 201, 202 in its longitudinal direction. The tank formation parts 203 to 206 include through holes to form a tank part from or into which the fuel and heat medium are distributed or merged together in a state where the pairs of the plate-shaped members 201, 202 are stacked up.

One 203 of the two tank formation parts on the upper end side of the plate-shaped members, and one 205 of the two tank formation parts on the lower end side of the plate-shaped members communicate with the fuel passage 21. The other one 204 of the two tank formation parts on the upper end side of the plate-shaped members, and the other one 206 the two tank formation parts on the lower end side of the plate-shaped members communicate with the heat medium passage 22.

In the present embodiment, the tank formation parts 203, 205 on the upper end side and lower end side of the fuel passage 21 illustrated in FIG. 5 communicate respectively with the fuel outlet part 212 and the fuel inlet part 211 illustrated in FIG. 2. The ammonia flowing in through the fuel inlet part 211 flows up through each fuel passage 21 and then flows out through the fuel outlet part 212. Similarly, the tank formation parts 204, 206 on the upper end side and lower end side of the heat medium passage 22 illustrated in FIG. 5 communicate respectively with the heat medium inlet part 213 and the heat medium outlet part 214 illustrated in FIG. 2. The engine coolant flowing in through the heat medium inlet part 213 flows down through each heat medium passage 22 and then flows out through the heat medium outlet part 214.

The heat exchanger having the above configuration is produced as follows. As illustrated in FIG. 3, with the two sheets of the plate-shaped members 201, 202 paired, more than one pair of the plate-shaped members 201, 202 are stacked up. One package obtained by packaging the absorbent material 27 is arranged between the adjacent two pairs of the plate-shaped members 201, 202. A material which is burned out in destruction by the heating at the time of brazing is used for a packing material for the absorbent material 27. The first joining parts 201a, 202a of the plate-shaped members 201, 202, and the second joining parts 201b, 202b of the plate-shaped members 201, 202 are respectively crimped together and temporarily assembled. Then, the entire heat exchanger is heated and integrally brazed. As a result, the heat exchanger having the above configuration can be manufactured.

Effects produced by the fuel carburetor 20 of the present embodiment will be described.

(1) As described above, the fuel carburetor 20 of the present embodiment includes the space part 26 which is provided in the fuel carburetor 20 and into which the ammonia gas leaking out of the fuel passage 21 flows; and the solid absorbent material 27 which is provided in the space part 26 for absorbing the ammonia gas.

Accordingly, the ammonia gas leaking out of the fuel passage 21 is evacuated into the space part 26 provided in the fuel carburetor 20, and this ammonia gas is absorbed by the solid absorbent material 27. As a result, the leakage of the ammonia gas from the fuel carburetor 20 can be prevented without sprinkling water.

Consequently, according to the present embodiment, as compared to the case of application of the water-sprinkling type ammonia removing device described in the above publication JP-A-2006-317127, it is not necessary to provide an installation space for the sprinkler nozzle or a large space for the water sprinkling. Therefore, an increase of the entire carburetor in size can be limited. In the present embodiment, since ammonia water is not produced, the recovery treatment of the ammonia water and strong corrosion resistance treatment against the ammonia water can be obviated.

(2) The fuel carburetor 20 of the present embodiment includes the partition part 23 that divides the fuel passage 21 from the heat medium passage 22. This partition part 23 includes the first partitioning wall 24 facing the fuel; and the second partitioning wall 25 that is spaced away from the first partitioning wall 24 to define the space part 26 between the wall 25 and the first partitioning wall 24 and that faces the heat medium. This space part 26 between the first and second partitioning walls 24, 25 is filled with the absorbent material 27.

Because the ammonia flowing through the fuel passage 21 has corrosive properties, in the present embodiment, corrosion resistance is given to the plate-shaped members 201, 202 by use of the plate-shaped members 201, 202 made of stainless alloy. However, erosion due to mechanical action of fluid flowing through the passage is caused after long periods of time. Accordingly, the ammonia gas may leak out through the eroded parts of the plate-shaped members 201, 202. In the present embodiment, the evacuation passage of the leaked ammonia gas is provided at the portion between the fuel passage 21 and the heat medium passage 22 that is the closest to the fuel passage 21.

In the case where the partition part 23 is configured to have the double-walled structure including the first and second partitioning walls 24, 25, the space part 26 exists between the first and second partitioning walls 24, 25. Accordingly, a thermal transmittance between the fuel passage 21 and the heat medium passage 22 is reduced as compared to a case where the space part 26 does not exist.

In the present embodiment, the space part 26 between the first and second partitioning walls 24, 25 is filled up with the absorbent material 27. Accordingly, the absorbent material 27 functions as a heat transfer member, thereby improving the thermal transmittance between the fuel passage 21 and the heat medium passage 22 as compared with the case of nothing disposed in this space part 26.

Generally, in a fuel carburetor having a fuel passage 21 and a heat medium passage 22, heat strain is caused in members 201, 202 which constitute the fuel passage 21 and the heat medium passage 22 due to a temperature difference between fuel and a heating medium. As a consequence, in the case where a space part 26 exists between first and second partitioning walls 24, 25, there are caused deformations of the first and second partitioning walls 24, 25 such that, for example, the walls 24, 25 are dented toward the space part 26, because of this heat strain. When this deformation is made, a stress is applied to the joining parts of the members 201, 202 which constitute the fuel passage 21 and the heat medium passage 22. If this stress becomes great, damage to the joining parts is caused. For this reason, in order to prevent the damage to the joining parts, it is necessary to add a reinforcing member for reinforcing the joining parts or to thicken the first and second partitioning walls 24, 25.

As a measure against this, the space part 26 between the first and second partitioning walls 24, 25 is filled up with the absorbent material 27. Accordingly, the first and second partitioning walls 24, 25 are put into a reinforced state, so that the deformations of the first and second partitioning walls 24, 25 cannot easily be caused. As a result, compared with the case of nothing disposed in this space part 26, the number of reinforcing members for reinforcing the joining parts can be reduced and the first and second partitioning walls 24, 25 can be made thin so as to decrease the size of the entire heat exchanger.

Second Embodiment

Figure 6:
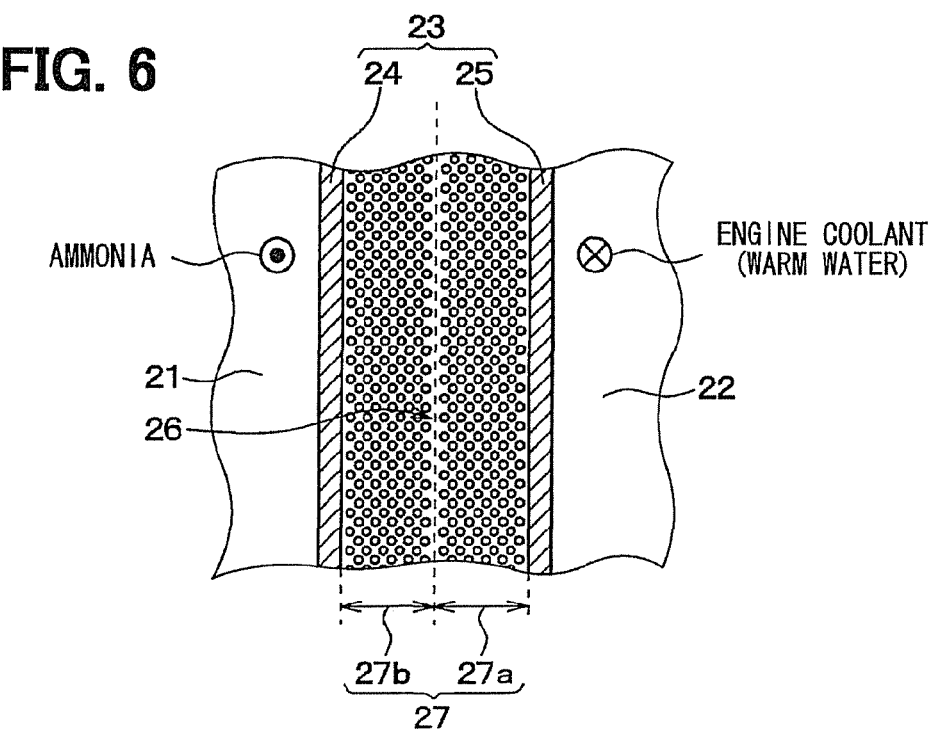
FIG. 6 is a partial cross sectional view illustrating a fuel carburetor in accordance with a second embodiment.

The present embodiment will be described in reference to FIGS. 6 and 7. FIG. 6 corresponds to an enlarged view of the partition part 23 in FIG. 3. In the present embodiment, two types of absorbent materials 27a, 27b are used for an absorbent material 27 with which to fill a space part 26 between first and second partitioning walls 24, 25. A region of the space part 26 closer to a fuel passage 21 is filled only with the second absorbent material 27b having a small speed of absorbing ammonia gas. A region of the space part 26 farther from the fuel passage 21 is filled only with the first absorbent material 27a having a large speed of absorbing ammonia gas.

Figure 7:
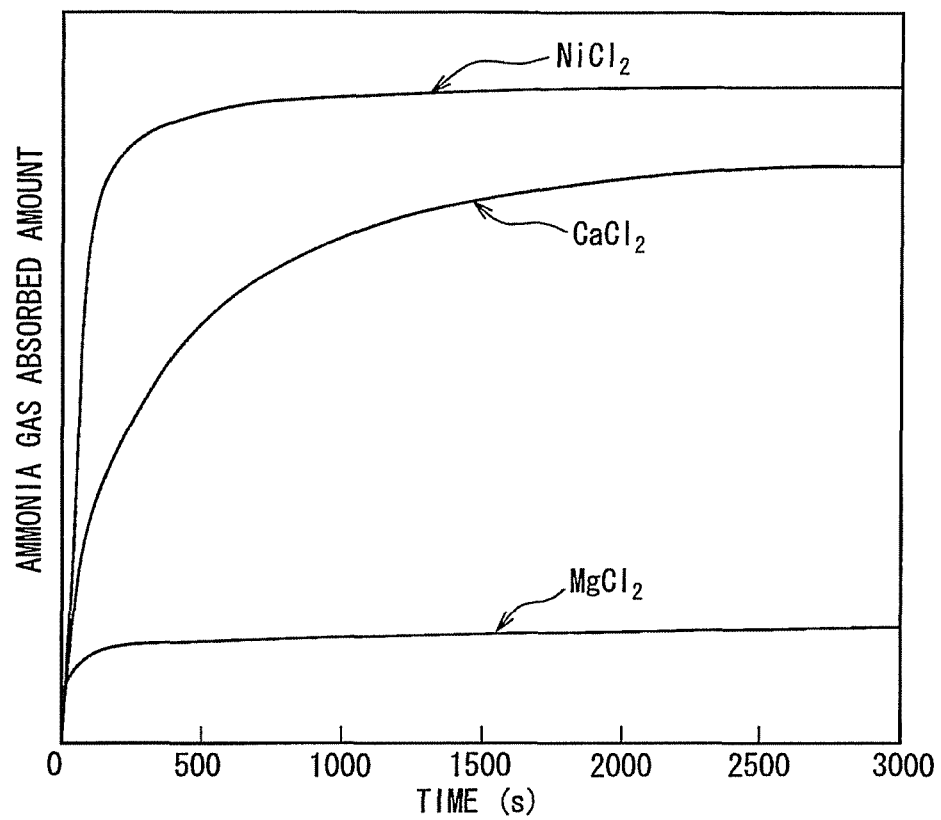
FIG. 7 is a result of measurement of a relationship between an ammonia gas absorbed amount and time for $NiCl_2$, $CaCl_2$, $MgCl_2$ as absorbent materials used in the second embodiment.

With regard to $NiCl_2$, $CaCl_2$, and $MgCl_2$ taken for example of the absorbent material 27 in the first embodiment, a relationship between an ammonia gas absorbed amount and time at temperature of 303K and at $NH_3$ (ammonia) partial pressure of 0.084 MPa is shown in FIG. 7. As regards the ammonia gas absorption speed [(kg)/(kg·s)], $NiCl_2$ is $4.6 \times 10^{-3}$; $CaCl_2$ is $3.0 \times 10^{-3}$; and $MgCl_2$ is $1.7 \times 10^{-3}$. Therefore, in comparison among the speeds of absorbing the ammonia gas by $NiCl_2$, $CaCl_2$, and $MgCl_2$, there is a relationship: $NiCl_2 > CaCl_2 > MgCl_2$.

Thus, for a combination of compounds used as the first and second absorbent materials 27a, 27b, there may be a case of the first absorbent material 27a being $NiCl_2$, and the second absorbent material 27b being $CaCl_2$; a case of the first absorbent material 27a being $NiCl_2$, and the second absorbent material 27b being $MgCl_2$; or a case of the first absorbent material 27a being $CaCl_2$, and the second absorbent material 27b being $MgCl_2$.

The heat exchanger having such a configuration is produced by preparing two packages in which the first and second absorbent materials 27a, 27b are respectively packed; and by heating the heat exchanger with these two packages arranged adjacent to each other to integrally braze the heat exchanger, in the production method of the heat exchanger described in the first embodiment.

If the ammonia gas leaks into the space part 26 through the first partitioning wall 24, all the absorbent materials 27, with which the space part 26 is filled, absorb the ammonia gas while the ammonia gas is diffused throughout the space part 26. However, when the absorbent material 27 closer to the fuel passage 21 is expanded to stop a gap, the diffusion of ammonia gas toward the absorbent material 27 located farther from the fuel passage 21 is hindered. As a consequence, the absorbent material 27 farther from the fuel passage 21 cannot absorb the ammonia gas despite its absorbable state.

In the present embodiment, the first absorbent material 27a located farther from the fuel passage 21 has larger ammonia gas absorption speed than the second absorbent material 27b located closer to the fuel passage 21. Accordingly, the first absorbent material 27a can absorb the ammonia gas in priority to the second absorbent material 27b located closer to the fuel passage 21. As a result, before the second absorbent material 27b located closer to the fuel passage 21 is expanded to inhibit the diffusion of ammonia gas toward the first absorbent material 27a located farther from the fuel passage 21, as much ammonia gas as possible can be absorbed into the first absorbent material 27a located farther from the fuel passage 21. Consequently, the amount of ammonia gas absorbed by the entire absorbent material can be increased.

In the present embodiment, the region of the space part 26 closer to the fuel passage 21, and the region of the space part 26 farther from the fuel passage 21 are filled up respectively with different kinds of the absorbent materials 27a, 27b independently. Alternatively, the regions may be filled with the different kinds of the absorbent materials 27a, 27b in a mixed state.

In this case, the regions may be filled with the first and second absorbent materials 27a, 27b, such that a filling ratio of the second absorbent material 27b is larger than a filling ratio of the first absorbent material 27a in the region of the space part 26 closer to the fuel passage 21; and that the filling ratio of the first absorbent material 27a is larger than the filling ratio of the second absorbent material 27b in the region of the space part 26 farther from the fuel passage 21. In this manner as well, similar effects to the present embodiment can be produced.

Moreover, in this case, one package in which the mixture of the first and second absorbent materials 27a, 27b is packed is prepared; and inside this one package, a mixing ratio of the first and second absorbent materials 27a, 27b is made different beforehand between the region of the space part 26 closer to the fuel passage 21 and the region of the space part 26 farther from the fuel passage 21. Accordingly, such a heat exchanger is produced.

Third Embodiment

The present embodiment will be described in reference to FIG. 8 which corresponds to an enlarged view of the partition part 23 in FIG. 3. In the present embodiment, a heat transfer member having a higher heat conductivity than an absorbent material 27 is disposed in a space part 26 between first and second partitioning walls 24, 25.

Figure 8:
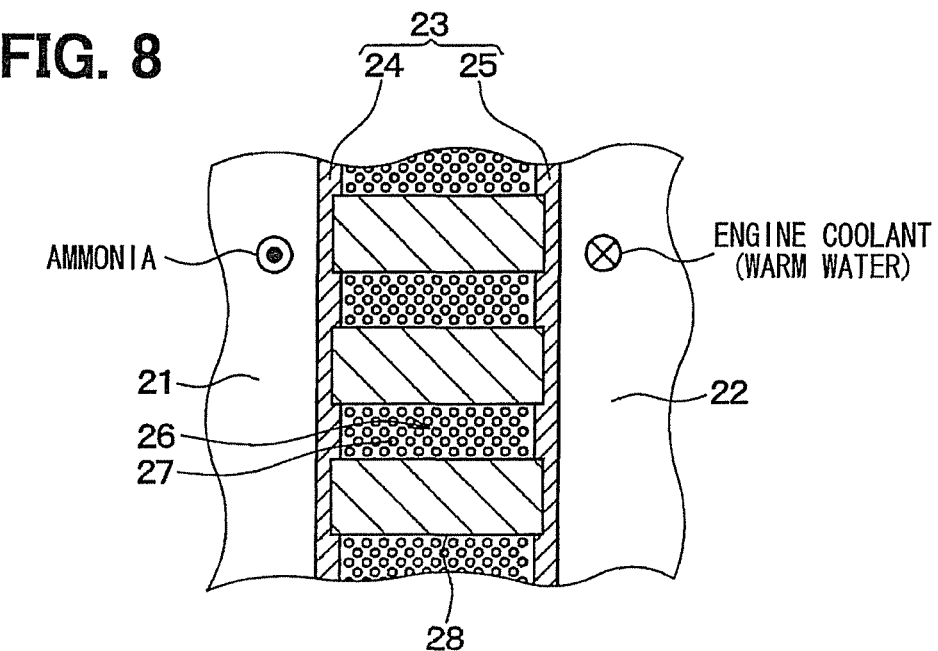
FIG. 8 is a partial cross sectional view illustrating a fuel carburetor in accordance with a third embodiment.

More specifically, as illustrated in FIG. 8, in the present embodiment, a connecting member 28 made of metal such as stainless alloy that connects together the first and second partitioning walls 24, 25 is arranged in the space part 26. Accordingly, the first and second partitioning walls 24, 25 are thermally connected by the connecting member 28. Since this connecting member 28 has a higher heat conductivity than the absorbent material 27, the thermal transmittance between a fuel passage 21 and a heat medium passage 22 can be improved compared to the case in which this connecting member 28 is not provided.

In the present embodiment, the connecting member 28 serving as a heat transfer member thermally connects together the first and second partitioning walls 24, 25. However, the heat transfer member does not necessarily thermally connect the first and second partitioning walls 24, 25. For example, metallic fiber or metal particles serving as a heat transfer member may be mixed with the absorbent material 27 to be disposed in the space part 26. In this case as well, the thermal transmittance between the fuel passage 21 and the heat medium passage 22 can be improved in comparison with the case where the heat transfer member is not arranged in the space part 26.

Modifications of the above embodiments will be described.

Figure 9:
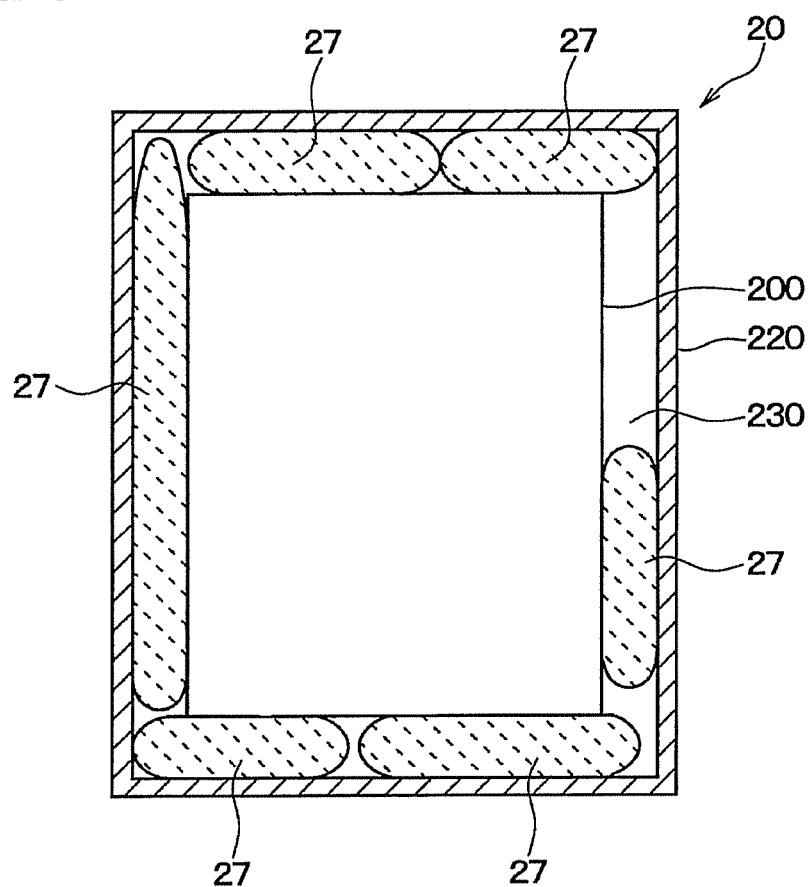
FIG. 9 is a conceptual diagram illustrating a fuel carburetor in accordance with a modification.

(1) In the above embodiments, the space part 26, in which the absorbent material 27 is disposed, is provided for the partition part 23 that divides the fuel passage 21 from the heat medium passage 22. Alternatively, the space part 26 may be provided at another part of the fuel carburetor 20. For example, as illustrated in FIG. 9, a fuel carburetor 20 may be configured to include a heat exchanger 200 having the fuel passage 21 and the heat medium passage 22; and a case 220 accommodating the heat exchanger 200. The absorbent material 27 may be disposed in a space part 230 formed between an inner surface of the case 220, and an outer surface of the heat exchanger 200.

(2) In the above embodiments, metallic halide is employed for the absorbent material 27. Alternatively, for example, another solid substance such as activated carbon, metal organic frameworks (MOF), zeolite, or silica gel can be used for the absorbent material 27. Moreover, not only the solid substance but also a liquid substance may be used for the absorbent material 27.

(3) In the above embodiments, it is illustrated that the energy output means is the engine EG disposed in the vehicle. However, application of the present disclosure is not limited to the above case. For example, the present disclosure can be applied also to a case of the energy output means being an internal combustion engine that is used for a stationary generator to output mechanical energy for driving the generator; or to a case of the energy output means being a combustor that combusts fuel to output heat energy.

(4) The above embodiments may be combined together as long as it is practicable. For example, the second embodiment and the third embodiment may be combined.

To sum up, the fuel carburetor 20 of the above embodiments can be described as follows.

The first aspect of the disclosure includes the space part 26 which is provided for the fuel carburetor 20 and into which the ammonia gas leaking out of the fuel passage 21 flows; and the absorbent material 27 which is provided in the space part 26 for absorbing the ammonia gas.

Accordingly, the ammonia gas leaking out of the fuel passage 21 is evacuated into the space part 26 provided in the fuel carburetor 20, and this ammonia gas is absorbed by the absorbent material 27. As a result, the leakage of the ammonia gas from the fuel carburetor 20 can be prevented without sprinkling water.

Therefore, according to the disclosure, as compared to the case of application of the water-sprinkling type ammonia removing device, it is not necessary to provide an installation space for the sprinkler nozzle or a large space for the water sprinkling. Therefore, an increase of the entire carburetor in size can be limited. In addition, according to the disclosure, since ammonia water is not produced, the recovery treatment of the ammonia water and strong corrosion resistance treatment against the ammonia water can be obviated.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A fuel carburetor comprising:
    a fuel passage through which ammonia as fuel flows;
    a heat medium passage which is arranged adjacent to the fuel passage and through which a heat medium flows;
    a space part into which ammonia gas leaking out of the fuel passage flows; and
    an absorbent material which is provided in the space part for absorbing the ammonia gas, the fuel carburetor configured to exchange heat between the fuel flowing through the fuel passage and the heat medium flowing through the heat medium passage so as to heat and vaporize the fuel.

2. The fuel carburetor according to claim 1, further comprising a partition part that divides the fuel passage from the heat medium passage, wherein:
    the partition part includes:
        a first partitioning wall that faces the fuel; and
        a second partitioning wall that is spaced away from the first partitioning wall to define the space part between the second partitioning wall and the first partitioning wall and that faces the heat medium; and
    the space part between the first partitioning wall and the second partitioning wall is filled with the absorbent material.

3. The fuel carburetor according to claim 2, wherein:
    the absorbent material includes:
        a first absorbent material having a large speed of absorbing the ammonia gas; and
        a second absorbent material having a small speed of absorbing the ammonia gas; and
    the space part is filled with the first absorbent material and the second absorbent material, such that:
        a filling ratio of the second absorbent material is larger than a filling ratio of the first absorbent material in a region of the space part closer to the fuel passage; and
        the filling ratio of the first absorbent material is larger than the filling ratio of the second absorbent material in a region of the space part farther from the fuel passage.

4. The fuel carburetor according to claim 2, further comprising a heat transfer member disposed in the space part, wherein the heat transfer member has a higher heat conductivity than the absorbent material.

5. The fuel carburetor according to claim 1, wherein metallic halide is used for the absorbent material.

6. The fuel carburetor according to claim 5, wherein the metallic halide is at least one of nickel (II) chloride ($NiCl_2$), calcium chloride ($CaCl_2$), and magnesium chloride ($MgCl_2$).

* * * * *